(12) United States Patent
Cornwall et al.

(10) Patent No.: US 6,934,316 B2
(45) Date of Patent: Aug. 23, 2005

(54) FREQUENCY HOPPING SPREAD SPECTRUM SYSTEM WITH HIGH SENSITIVITY TRACKING AND SYNCHRONIZATION FOR FREQUENCY UNSTABLE SIGNALS

(75) Inventors: Mark K. Cornwall, Spokane, WA (US); Harry Price Haas, Atlanta, GA (US)

(73) Assignee: Itron, Inc., Spokane, WA (US)

( * ) Notice: Subject to any disclaimer, the term of this patent is extended or adjusted under 35 U.S.C. 154(b) by 614 days.

(21) Appl. No.: 09/920,355

(22) Filed: Aug. 1, 2001

(65) Prior Publication Data

US 2002/0071478 A1 Jun. 13, 2002

Related U.S. Application Data

(60) Provisional application No. 60/222,256, filed on Aug. 1, 2000.

(51) Int. Cl.⁷ ................................................ H04B 1/713
(52) U.S. Cl. ........................................................ 375/134
(58) Field of Search ......................... 375/130, 132–137, 375/324, 316, 260, 364–368, 222, 343; 370/241, 310

(56) References Cited

U.S. PATENT DOCUMENTS

| 5,056,107 A | | 10/1991 | Johnson et al. |
| 5,121,408 A | * | 6/1992 | Cai et al. ................... 375/134 |
| 5,365,550 A | | 11/1994 | Roberson |
| 5,386,435 A | | 1/1995 | Cooper et al. |
| 5,668,828 A | | 9/1997 | Sanderford, Jr. et al. |
| 5,870,426 A | | 2/1999 | Yokev et al. |
| 5,909,640 A | | 6/1999 | Farrer et al. |
| 5,940,428 A | | 8/1999 | Ishiguro et al. |
| 6,052,406 A | | 4/2000 | Epstein et al. |
| 6,052,407 A | | 4/2000 | Ciccone et al. |
| 6,178,193 B1 | | 1/2001 | Kondo |
| 6,188,715 B1 | | 2/2001 | Partyka |
| 6,263,009 B1 | | 7/2001 | Ramberg et al. |
| 6,618,452 B1 | * | 9/2003 | Huber et al. ................. 375/343 |
| 6,721,364 B1 | * | 4/2004 | Ueno et al. .................. 375/259 |
| 6,782,037 B1 | * | 8/2004 | Krishnamoorthy et al. . 375/138 |

* cited by examiner

*Primary Examiner*—Tesfaldet Bocure
*Assistant Examiner*—Pankaj Kumar
(74) *Attorney, Agent, or Firm*—Patterson, Thuente, Skaar & Christensen, P.A.

(57) ABSTRACT

A wireless spread spectrum communication system for transmitting data includes a plurality of end point transmitters and at least one receiver. The end point transmitters transmit data via a frequency hopped spread spectrum signal where the transmitting signal is sent without the benefit of frequency stabilization. The receiver is responsive to the frequency hopping spread spectrum signals and includes a correlator and a signal processor. The correlator samples at least a first portion of a preamble of the signal and correlates the portion of the preamble with a known preamble pattern to determine a probability of correlation. The signal processor applies a Fast Fourier Transform algorithm to the signal in response to the probability of correlation to track a narrowband frequency of the signal based on at least a second portion of the preamble and to decode data encoded within the signal subsequent to the preamble.

20 Claims, 4 Drawing Sheets

FREQUENCY HOPPING SPREAD SPECTRUM SYSTEM WITH HIGH SENSITIVITY TRACKING AND SYNCHRONIZATION FOR FREQUENCY UNSTABLE SIGNALS

RELATED APPLICATIONS

The applicants hereby claim benefit of the contents and filing date accorded to U.S. Provisional Patent Application filed Aug. 1, 2000 as Ser. No. 60/222,256 and entitled, "High Receiver Sensitivity Transceiver." The present invention is related to co-pending application assigned to the assignee of the present invention and entitled "Spread Spectrum Meter Reading System Utilizing Low-Speed/High Power Frequency Hopping", filed Jul. 23, 2001, Ser. No. 09/911,840, the disclosure of which is hereby incorporated by reference.

FIELD OF THE INVENTION

The present invention relates to frequency hopping spread spectrum radio systems and, more particularly, to a spread spectrum radio system that utilizes a receiver that tracks and synchronizes with frequency unstable frequency hopped spread spectrum signals from a multitude of low cost end point transmitters as used, for example, in wireless automatic meter reading systems.

BACKGROUND OF THE INVENTION

Wireless automatic meter reading systems are well known. Typically, each utility meter is provided with a battery-powered encoder that collects meter readings and periodically transmits those readings over a wireless network to a central station. The power limitations imposed by the need for the encoder to be battery powered and by regulations governing radio transmissions effectively prevent direct radio transmissions to the central station. Instead, wireless meter reading systems typically utilize a layered network of overlapping intermediate receiving stations that receive transmissions from a group of meter encoders and forward those messages on to the next higher layer in the network as described, for example, in U.S. Pat. No. 5,056,107. These types of layered wireless transmission networks allow for the use of lower power, unlicensed wireless transmitters in the thousands of end point encoder transmitters that must be deployed as part of a utility meter reading system for a large metropolitan area.

In 1985, as an attempt to stimulate the production and use of wireless network products, the FCC modified Part 15 of the radio spectrum regulation, which governs unlicensed devices. The modification authorized wireless network products to operate in the industrial, scientific, and medical (ISM) bands using spread spectrum modulation. The ISM frequencies that may be used include 902 to 928 MHz, 2.4 to 2.4835 GHz, and 5.725 to 5.850 GHz. The FCC allows users to operate spread spectrum wireless products, such as utility metering systems, without obtaining FCC licenses if the products meet certain requirements. This deregulation of the frequency spectrum eliminates the need for the user organizations to perform cost and time-consuming frequency planning to coordinate radio installations that will avoid interference with existing radio systems.

Spread spectrum modulators use one of two methods to spread the signal over a wider area. The first method is that of direct sequence spread spectrum, or DSSS, while the second is frequency hopping spread spectrum, or FHSS. DSSS combines a data signal at the sending station with a higher data rate bit sequence, which many refer to as a chipping code (also known as a processing gain). A high processing gain increases the signals resistance to interference. FHSS, on the other hand, relies on the distribution of a data signal randomly hopped across a number of defined frequency channels to avoid interference.

FHSS operates by taking the data signal and modulating it with a carrier signal that hops from frequency to frequency as a function of time over a wide band of frequencies. With FHSS, the carrier frequency changes periodically. The frequency hopping technique reduces interference because an interfering signal from a narrowband system will only affect the spread spectrum signal if both are transmitting at the same frequency and at the same time. Thus, the aggregate interference will be very low, resulting in little or no bit errors.

A hopping code determines the frequencies the FHSS transmitter will transmit and in which order. To properly receive the signal, the FHSS receiver conventionally is set to the same hopping code and listens to the incoming signal at the right time and correct frequency. In order for this approach to be effective, however, both the FHSS transmitter and FHSS receiver must be synchronized with one another on the same hopping code pattern and must be tracking on the same frequency.

Synchronization can be accomplished by synchronizing the FHSS transmitter and receiver in time as described, for example, in U.S. Pat. No. 5,386,435, but this requires either extremely accurate clocks in both the FHSS transmitter and receiver or some external channel that is used to synchronize the clocks. More conventionally, an encoded preamble at the beginning of each transmission is used to synchronize the FHSS transmitter and receiver. U.S. Pat. No. 6,052,406 describes a FHSS system that utilizes a correlator to synchronize an incoming sampled data stream with a known sync pattern once a phasing arrangement partitions the sampled data stream into a first and second sampled sequences. U.S. Pat. No. 6,052,407 describes a FHSS system for a cordless telephone system that builds up a table of the spectrum energy of transmissions over time and uses this table to correlate further incoming signals to determine synchronization to the frequency hopping pattern. U.S. Pat. No. 6,178,193 describes an arrangement the uses a correlated power calculation for fading periods to adjust the transmission power level of a FHSS transmitter to achieve better synchronization.

Tracking of FHSS transmissions has conventionally relied on the stability of the transmitted frequency. Generally, a transmitter will wander or drift in frequency over time due to aging or changes in temperature or voltage. Frequency stabilization circuitry has been traditionally incorporated at the FHSS transmitter level in order to control and adjust for any frequency drifting. Synthesizers, such as a phased lock loop (PLL), are used to control or stabilize the transmitter's output frequency as described, for example, in U.S. Pat. No. 5,940,428. Each modulated signal passes through this circuitry before transmission. Unfortunately, such PLL circuitry causes an unwanted drain on power and adds significant costs to the FHSS transmitter. In a wireless meter reading system, for example, where cost and battery power are central concerns, these undesirable consequences of stabilization circuitry can erect a significant manufacturing and system design barrier.

It is possible to eliminate the synthesizer circuitry at the FHSS transmitter level. Conventional technology adjusts for this frequency wandering of the transmitter signal by increasing the FHSS receiver's intermediate frequency (IF) bandwidth to accommodate for the frequency drifting. However, this solution decreases the FHSS receiver sensitivity as the FHSS receiver IF bandwidth increases. In low power transmissions for a FHSS system, high receiver sensitivity is essential in order to be able to pick out weak FHSS signals from background noise.

U.S. Pat. No. 6,188,715 describes a FHSS system for multiple sensor transmitters that intermittently transmit very short status messages. The FHSS receiver utilizes a Fast Fourier Transform (FFT) to detect transmitted carrier power at several different frequencies in order to improve synchronization and signal acquisition. Once the FFT determines which frequency contains a signal of interest from the wideband FHSS signal, the FHSS receiver tunes one or more narrowband frequency receivers using a digitally programmable finite impulse response (FIR) filter in response to the output of the FFT and the status of time and frequency registers representing the frequency hopping code. While this arrangement can improve synchronization, the use of separate narrowband frequency receivers still requires that the FHSS transmitters utilize frequency stabilization circuitry in order to provide sufficient frequency tracking.

As a result of these undesirable barriers associated with the use of frequency stabilization circuitry in conventional meter reading systems, there exists a need for a low cost, low power, receiver that is capable of identifying, locating, and tracking FHSS signals received from a transmitter that does not utilize frequency stabilizing circuitry. Additionally, the receiver must be able to accommodate for these potentially unstable signals while at the same time maintaining high receiver sensitivity.

SUMMARY OF THE INVENTION

A wireless spread spectrum communication system for transmitting data includes a plurality of end point transmitters and at least one receiver. The end point transmitters transmit data via a frequency hopped spread spectrum signal where the transmitting signal is sent without the benefit of frequency stabilization. The receiver is responsive to the frequency hopping spread spectrum signals and includes a correlator and a signal processor. The correlator samples at least a first portion, e.g., 34 chips, of a preamble of the signal and correlates the portion of the preamble with a known preamble pattern to determine a probability of correlation. The signal processor applies a Fast Fourier Transform (FFT) algorithm to the signal in response to the probability of correlation to track a narrowband frequency of the signal based on at least a second portion, e.g., the last 6 chips, of the preamble and to decode data encoded within the signal subsequent to the preamble.

In a preferred embodiment, the FFT algorithm operates on sampled data to produce multiple bins, each bin corresponding to a different narrowband frequency within the signal. Preferably, the FFT algorithm sums a plurality of chip values in each bin against expected chip values for a second portion of the preamble to determine a bin having a highest value as the narrowband frequency containing the encoded data signal.

In a preferred embodiment of a receiver in accordance with the present invention, the receiver includes a mixer that receives the signal and mixes the signal with a base signal to produce an intermediate frequency that is supplied as the signal to the correlator and the signal processor. A stength of the signal supplied to the correlator is evaluated and if the strength of the signal supplied to the correlator is strong enough to perform a decode of the data encoded within the signal subsequent to the preamble, the signal processor does not use the FFT algorithm to decode the data encoded within the signal subsequent to the preamble.

Preferably, the digital signal processor is supplied with two sampled inputs, a first sampled input from an analog-to-digital converter operating at a first speed and a second sampled input from an analog-to-digital converter operating at a second speed, where the second speed is slower than the first speed. A received signal strength indicator (RSSI) detector circuit is operably connected to an input to the second digital-to-analog converter that is used by the signal processor to decode the encoded data if the strength of the signal of the correlator is strong enough to perform a decode Preferably, the test of whether the signal is a strong signal is the ability to decode a packet and calculate a good CRC. In one embodiment, a switchable front-end amplifier operably receives the signals and selectively attenuates the signals based on signal strength. A linear detector is operably coupled to an output of the front-end amplifier and to an input of the correlator to provide enhanced dynamic range and low sensitivity to in-band interference.

The FHSS system of the present invention allows for the deployment of end point transmitters having free running local oscillators that are allowed to drift over time, effectively creating a non-channelized frequency hopping system. Not only can the frequency vary between messages sent by the end point transmitters, the present invention provides a robust design for the receiver that can tolerate drift even during the transmission of a single message. The end result is a robust receiver that improves overall system performance while enabling a significant reduction in the cost of thousand or hundreds of thousands of end point transmitters that are deployed as part of the system.

DETAILED DESCRIPTION OF PREFERRED EMBODIMENTS

Figure 1:
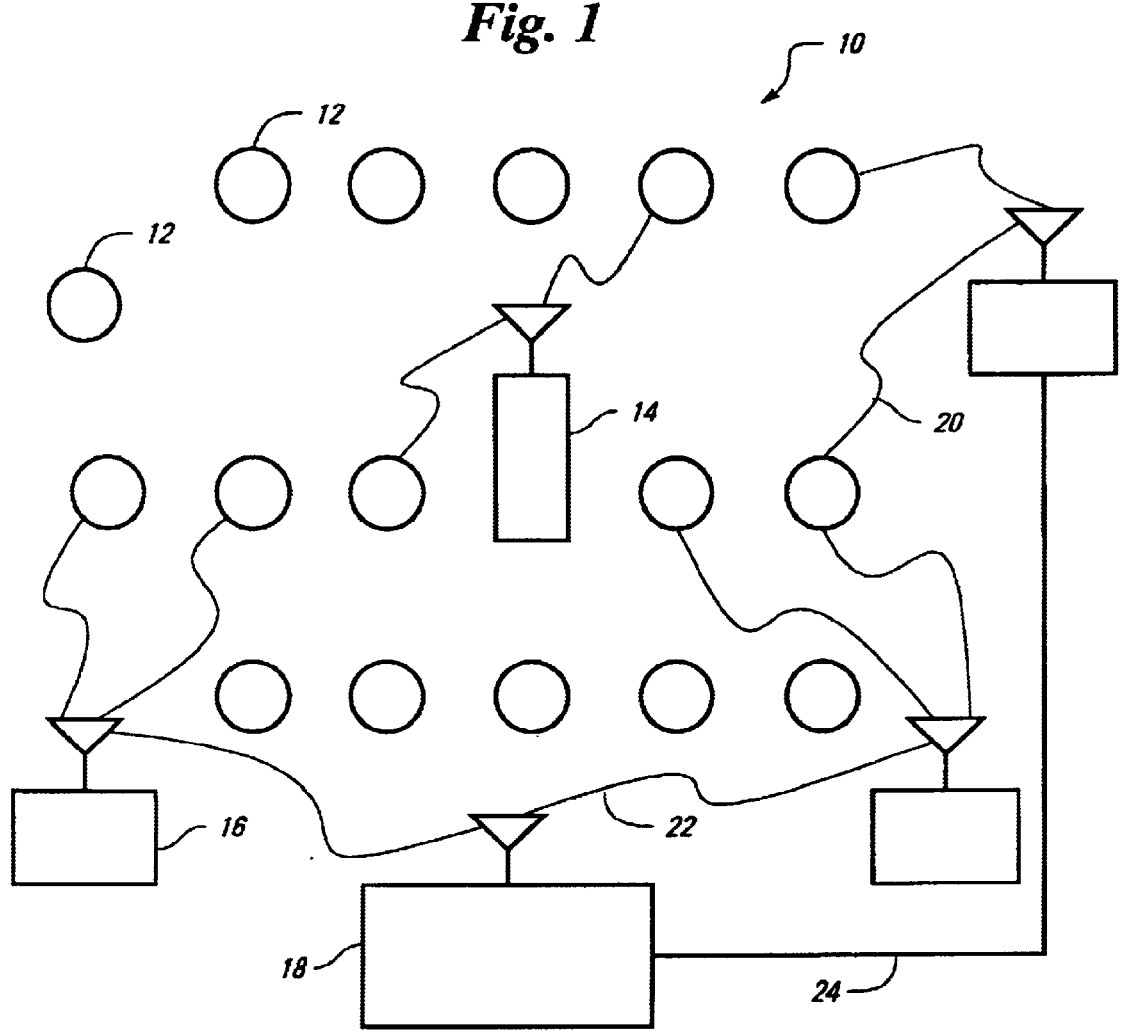
FIG. 1 is an overall schematic diagram of a frequency hopping spread spectrum (FHSS) system in accordance with the present invention.

Referring now to FIG. 1, an overall schematic diagram of a preferred embodiment of a wireless frequency hopping spread spectrum (FHSS) system 10 in accordance with the present invention will be described. The FHSS system 10 includes a multitude of end point transmitters 12 and at least one radio 14, 16 having at least a receiver. In a preferred embodiment, the end point transmitters 12 are battery-operated meter reader encoder transmitters operably connected to a utility meter. In this embodiment, it is expected that anywhere from hundreds to hundreds of thousands of end point transmitters 12 will be deployed as part of a FHSS system 10 installed in a metropolitan area, for example.

Alternatively, end point transmitters 12 can be low power sensors, detectors or other data encoders that transmit encoded data using a FHSS signal 20. Preferably, end point transmitters 12 are deployed at a multitude of fixed locations over an entire coverage zone. Alternatively, end point transmitters 12 could be mobile transmitters operating within one or more coverage zones, such as pagers or portable transponders.

In one embodiment, the radio comprises a mobile radio 14 that receives encoded data in the form of FHSS signals 20 from the multitude of end point transmitters 12 and stores the data for later downloading or retransmission as a user traverses over an area associated with the multitude of end point transceivers 12. Preferably, the mobile radio 14 is a handheld radio carried by an operator walking a meter reading route. Alternatively, the mobile radio 14 can include one or more radios mounted in a vehicle that drives streets to collect meter reading data. In another embodiment, the receivers comprise a plurality of fixed intermediate radios 16 arranged in hierarchical network of overlapping zones of coverage that receive encoded data from the end point transmitters 12 and forward the data by retransmission to a central station 18. Reference is made to the previously-identified co-pending application entitled "Spread Spectrum Meter Reading System Utilizing Low-Speed/High Power Frequency Hopping" for a more detailed description of a network of fixed intermediate radios 16 and a central station 20, the disclosure of which is hereby incorporated by reference. The radios 14, 16 may be designed as half-duplex radios (transmit or receive but not both simultaneously); however, this architecture has been shown to have some limitations. Preferably, the radios 14, 16 are implemented as a full-duplex design (transmit and receive simultaneously). Alternatively, the radios 14, 16 may include only a receiver.

In one embodiment, the radios 14, 16 are capable of wireless retransmission of data 22 to the central station 18. Alternatively, the radios 14, 16 can store data until it is manually or automatically downloaded to the central station 18, or the radios may be equipped with other communication channels 24, such as telephone lines, power lines, satellite, cellular phone or the like to transmit immediately or in a store and forward mode data received from the end point transmitters 12, either individually or combined into larger blocks or summarized over time for the purpose of creating a metered function associated with one or more end point transmitters 12.

It will be understood that the end point transmitters 12 may be of the bubble-up variety wherein encoded data is automatically periodically transmitted by the transmitter 12 (either according to a predefined timing pattern or pseudo-randomly), or the transmitters 12 may be polled or interrogated to respond to a wakeup tone, for example, transmitted by the mobile radio 14 or fixed radio 16 and then transmit FHSS signals 20 with encoded data in response to the polling or interrogation signal.

Figure 2:
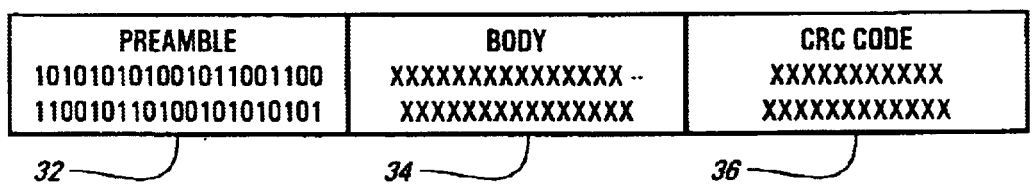
FIG. 2 is a diagram of one embodiment of an encoded FHSS packet that is received in accordance with the present invention.

In a preferred embodiment as shown in FIG. 2, the FHSS signal 20 preferably are sent as encoded packets of data 30 transmitted as a frequency hopping spread spectrum signal transmitted in the band between 910–920 MHz as unlicensed frequency hopping spread spectrum transmitters operating in accordance with FCC Part 15.249 (transmitter power less than 500 mW) or Part 15.247 (transmitter power less than 5 W). For purposes of the present invention, transmitters 12 operating under either of these regulations are considered to be low powered transmitters. Preferably, the encoded packets 30 are sent in accordance with a predefined protocol. One such protocol is the ERT protocol for meter encoder transmitters manufactured by Itron, Inc., the assignee of the present invention as described, for example, in [citation to FCC license]. Another such protocol is the PET protocol as defined in the previously-identified copending application entitled "Spread Spectrum Meter Reading System Utilizing Low-Speed/High Power Frequency Hopping". In a preferred embodiment, the encoded data of the packet 30 is on-off keyed (OOK) modulated. Other amplitude modulation (AM) techniques may also be used. It is also possible for the encoded data to be modulated using other modulation techniques, such as frequency modulation (FM) or frequency shift key (fsk) modulation, although additional circuitry may be required to implement these techniques as will be appreciated by a person of ordinary skill in the art.

Unlike existing approaches to decoding ERT packets, for example, the present invention takes a radically different approach to decoding ERT packets. The standard consumption message packet 30 that is sent out by an ERT module 12 is comprised of three major components. A preamble 32 begins the message packet 30, and is a series of bits that are always the same. The preamble 32 is used to allow the radios 14, 16 to synchronize with the incoming packet. The body 34 of the message 30 contains the consumption, ID, tamper, and type information for that particular end point transmitter 12 at that particular point in time. The end code 36 of the message 30 is preferably a CRC (cyclic redundancy check) code that contains information that is used to verify that the packet 30 was decoded accurately.

In a preferred embodiment, end-point modules 12, even those that normally operate in a bubble-up fashion, respond to a wake-up tone, which is a proper frequency carrier modulated at the programmed wake-up tone. The wake-up tone causes the end point transmitter 12 to generate a burst of some number (programmable) of copies of the same message 30. The end point transmitter 12 response is asynchronous, that is, the message packet 30 can be sent any time after about ¾ of a second of a valid wakeup tone. A typical end point transmitter 12 will respond to a valid wake-up with eight packets 30, which will be sent at slightly different frequencies (in accordance with a frequency hopping table). In this embodiment, end point transmitters 12 provide the capability to select a wide range of wake-up frequencies (952–956 MHz) and wake-up tones (28–62 Hz) field.

Figure 3:
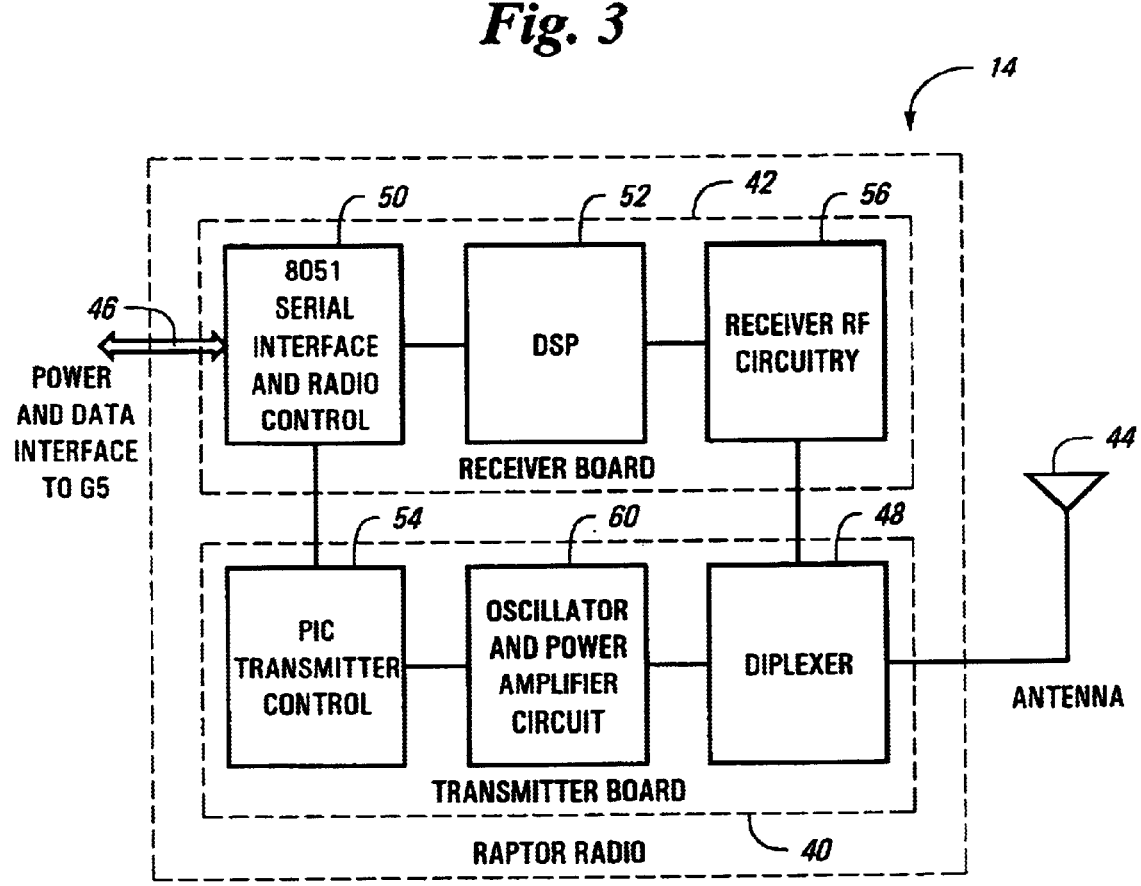
FIG. 3 is a block diagram of a transceiver of a handheld meter reading radio in accordance with one embodiment of the present invention.

As shown in FIG. 3, the radio 14 is preferably provided with a transmitter board 40 that can emit the desired wake-up tones. A receiver board 42 is used to receive the FHSS signals. Preferably, both transmissions and receptions are routed through a common antenna 44 via a diplexer 48. Power and user interface data are provided to the radio 14 via an interface 46. The primary parts of the transceiver 14 include a microcontroller 50, such as an 8051 microcontroller, a signal processor 52, preferably a digital signal processor (DSP) 52, a PIC controller 54, the receiver RF circuitry section 56, the transmitter RF circuitry section 58, and the diplexer 48. The 8051 controller 50 acts as the traffic cop for the radio 14. The controller 50 directs data and commands from to the DSP 52 and PIC processor 54, and sends status and data back from these chips to the interface 46. The DSP 52 is preferably a DSP chip from Texas Instruments, and is the mathematical calculator for the correlator, decoder, and FFT engine as will be described. The DSP 52 also sets the receiver center frequency, and switches in and out the attenuation of the front-end amplifier. The receiver RF section 56 implements a sensitive amplifier, mixer, and various filters to bring incoming ERT packets to the decoder. The PIC controller 54 in the transmitter board 40 programs the transmit frequency, enables the power amplifier, and modulates the RF carrier with the appropriate wake-up tone. The transmitter RF section 58 contains a voltage-controlled oscillator (VCO) that creates the outgoing RF carrier, and a power amplifier section 60 to create the high power wake-up signal. The diplexer 48 is a series of filters designed to allow simultaneous operation of the transmitter 40 and receiver 42. Almost all full-duplex radios exhibit some loss of receiver sensitivity with the transmitter enabled, unless the transmitter frequency is greatly different from the receiver frequency. The radio 14 exhibits far less receiver de-sense than conventional FHSS receivers except those receivers which use a very large, very expensive diplexer for isolation.

In previous FHSS meter reading systems of the assignee Itron, Inc., the receiver was designed to sample bit sliced data from the detector output to look for ERT packets 30. These previous systems utilized the approach, so to speak, that if a packet 30 looks like an ERT packet, and smells like an ERT packet, than it must be an ERT packet. That is to say, the receiver sampled the air to look for the preamble 32 of an ERT packet 30, and when the receiver recognized the particular sequence of bits of the preamble 32, the receiver synchronizes to the timing of the bits of the preamble 32 (and sometime the first couple bits of the body 34), and then uses that time beat to decode the remaining bits of the packet 30.

The receiver 42 of the radios 14, 16 in accordance with the present invention goes a step further. The receiver 42 samples the output of the detector without bit slicing the data. The preamble 32 of the packet 30 is always the same, that is, the receiver 42 knows what to look for to see the start of a packet 30. This allows the receiver 42 to use some fancy math known as correlation as preferably implemented by a correlator. In accordance with the present invention, a correlator is circuitry or a processor or controller programmed to compare the incoming stream of bits to the known values as designed in the message. In the embodiment as shown in FIG. 3, the correlator is implemented in the DSP 52. The correlator gives low values of correlation until an ongoing (preferably, over twenty or so bits) match is perceived. In this case, the correlator output becomes very high. So with the present invention, there is no guessing whether the packet 30 is a valid ERT packet, the correlator allows the radio 14, 16 to know the packet 30 is a valid ERT packet (within the statistical probability of a false match). Not only that, but the receiver 42 has an accurate timing of the packet bit stream, allowing the radio 14, 16 to decode the remaining portions of the packet 30 in the center of each bit, which increases the number of cleanly decoded packets.

In previous Itron receivers, when the incoming ERT packet 30 was weak (near the base level of noise in the receiver) it became impossible to distinguish the ERT packet from the noise. With a correlator implemented in accordance with the present invention, the receiver 42 can actually detect the presence of a valid packet below the base level of noise (what is commonly referred to as looking into the noise). The preferred embodiment of the correlator can produce an increase of sensitivity of at least 12 dB over existing Itron receivers. As will be described, for weak signals, the use of the FFT engine by the DSP 52 also can provide an additional 9 dB of improvement in sensitivity when analyzing the final portion of the preamble to determine the narrowband frequency that contains the packet 30.

In a preferred embodiment, the end point transmitters 12 send packets 30 in the band between 910–920 MHz. The vast majority of existing end point transmitters 12 send some or all of their packets 30 in the band between 913–918 MHz. In previous receiver designs, it was necessary to limit the amount of air that can be looked at, at one time, to about 1.4 MHz, in order to achieve the desired sensitivity of the receiver. With the advanced digital signal processing techniques used in the receiver 42 of the present invention, the same sensitivity as the former radios is achieved, but the receiver 42 can see a 7 MHz window across the wideband frequency. In the previous designs, it was possible that the receiver window was not in the place where the end point transmitter 12 was transmitting at the time that the transmitter 12 was transmitting the packets 30. The previous receivers would scan over the ERT transmit band (actually the previous receivers scanned less than the full 10 MHz band, typically about 1.4 MHz at one time) looking for packets 30, but could sometimes miss a packet if the packet was transmitted in a portion of the band that was not then being scanned. In the receiver 42 of the present invention, at least about sixty-six percent (66%) and preferably the entire useful wideband is monitored at all times. If an ERT packet 30 is being transmitted, and the FHSS signal 20 for that packet is reasonably strong at the receiver 42, the receiver 42 will recognize that packet.

The receiver 42 of the preferred embodiment preferably examines the entire useful portion of the wideband at once looking for a correlation output signal indicative that there is a packet in the air. In this embodiment, most ERT transmitters 12 transmit at frequencies between 913 MHz and 918 MHz so the receiver 44 examines a 7 MHz band looking for correlation. The advantages of correlation are realized because the correlator knows what the preamble of an ERT packet 30 looks like, and looks for a match. The receiver 42 has no way of using a correlation technique to detect or decode the remainder of the ERT packet 30, because after the preamble 32 the bit pattern in the body 34 and end code 36 will vary randomly according to the content of the encoded data, such as ID, consumption, CRC, or other variable data information. The present invention runs the DSP 52 as a correlator on a significant portion of the wide band FHSS signal 20 to detect the existence of preamble 32. Once the packet 30 is detected by reason of the preamble 32, then the receiver 42 has a signal processor 52 perform a Fast Fourier Transform (FFT). From the FFT, the narrowband frequency that the packet 30 is being transmitted on by the transmitter 12 is effectively determined.

Figure 4:
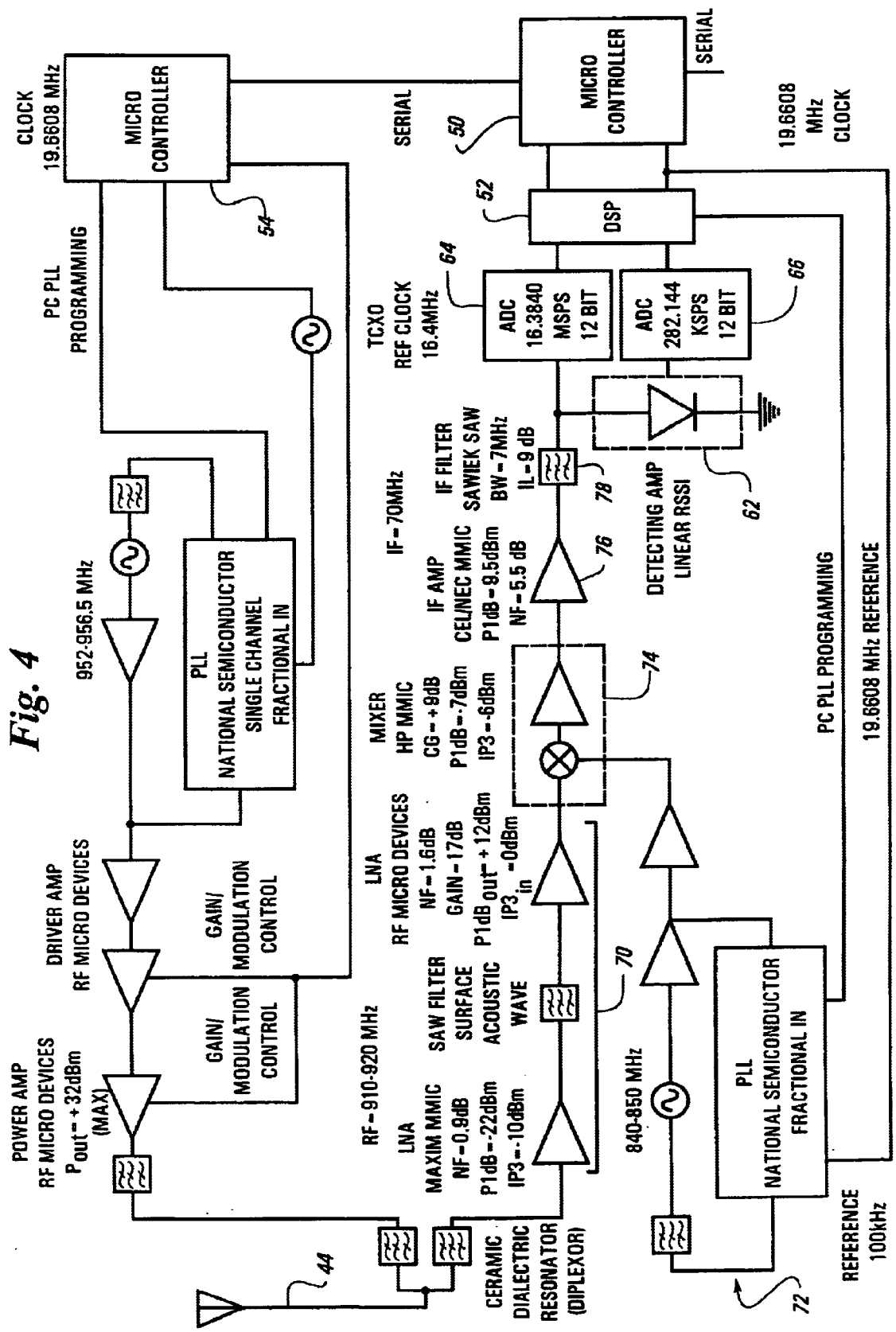
FIG. 4 is a circuit diagram of the transceiver as shown in FIG. 4.

Unlike existing techniques that utilize a wideband signal processing algorithm, the present invention utilizes the wideband signal processing algorithm to also decode from the data derived from the FFT that is contained in the remaining portion of the packet 30. Preferably, as the data samples are collected for the FFT decoding, the wide band signal is also sampled and decoded by a wide band circuit in the form of a receive signal strength indicator (RSSI) amplifier 62 coupled to a 12-bit analog-to-digital converter 64 as shown in FIG. 4. If the data can be decoded because of good signal strength in wide band mode by the wide band circuit, the FFT decode is aborted. This saves on computation time and allows the receiver 42 to start the correlator 46 to find another transmission.

Preferably, the DSP 52 of the receiver 42 uses a technique known as a Fast Fourier transform (FFT), or other comparable advanced digital signal processes to process the wideband signal. The FFT engine as coded and executed by the DSP basically splits the 7 MHz band into thirty-two equal channels of about 250 KHz. The FFT shows the presence of ERT transmission power in one of these channels. It would be very difficult to know, just looking at a stream of FFT data, when an ERT packet is coming through in the midst of random noise. Recall however, that the correlator is able to tell the FFT engine almost exactly when ERT data is coming through the pipe. The FFT engine is then able to look at all thirty-two channels, and determine where the ERT data is from the changing data pattern. Preferably, this is done by correlating on 34 out of 40 bits in the preamble 32. The last six bits are used to find the target channel bin. Since the expected state of the bits is known as they are part of the preamble 32, the FFT channel bins are scanned looking for the bin that contains the strongest representation of the expected bit pattern of the preamble 32. The FFT engine is far more sensitive than previous versions of receivers because the amount of noise to contend with is much smaller in narrow channels.

An additional feature of the preferred embodiment of the receiver 42 is its ability to track an ERT packet 30 if the FHSS signal 20 should drift in frequency. This is accomplished by decoding the target channel, that is the channel with the strongest signal of the ERT packet 30. If the FHSS signal 20 drifts in frequency and is no longer present in the target channel the decoding will fail the CRC check. The receiver 42 saves all of the FFT information during the decoding process and will rerun the decode operation on the target channel averaged together with the next adjacent channel. This is performed on each adjacent channel giving the receiver 42 the ability to track and ERT that is drifting either higher or lower in frequency than the frequency of the target channel. Therefore, in the receiver 42 of the present invention, the FFT yields a sensitivity better than any of existing FHSS receiver for low power transmitter encoders 12.

Because the FFT works best for weak signals, and the math takes additional time to run an FFT, the receiver 42 preferably has two different stages of operation. The receiver 42 will actually sample a signal called RSSI (receive signal strength indicator) for strong FHSS signals 20, and switch to FFT mode for weaker FHSS signals 20. This dual-mode capability is automatic (the receiver makes a determination of power on the fly and adjusts accordingly) and allows excellent reception for all levels of FHSS signals 20.

Referring now to FIG. 4, a detailed circuit diagram of the radio 14 will be described. The primary parts of the receiver board 42 of FIG. 4 are linear detector circuitry 62, an IF frequency generator 72, a mixer 74, IF amplifier 76 and filter 78, analog to digital (A/D) converters 64, 66, and the DSP 52. The received RF signal from the antenna 44 is received in the range of 910–920 MHZ. The IF frequency generator 72 generates a frequency in the range of 840–850 MHZ. To create the IF signal 80, the IF frequency generator 72 signal is low side injected to the mixer 74. Following the use of the mixer 74, an IF amplifier 76 and IF filter 78 are utilized to create the 70 MHZ IF signal. This signal is then fed into the DSP 52 after passing through the high speed A/D converter 64 and low speed A/D converter 66. The high speed A/D converter 64 samples the 70 MHZ signal. This is under sampling the signal, which is the digital equivalent of a mixer. Under sampling translates the 70 MHZ IF to base band. The samples are then fed into the DSP 52, which runs a 64 point FFT as will be described. The 64 point FFT creates thirty-two unique frequency bins, each 256 KHZ wide.

The components of the receiver board 42 of FIG. 4 of a preferred embodiment of the present invention also include a RF amplifier 70 that preferably is comprised of two linear amplifiers (LNA) and a surface acoustic wave filter (SAW) to produce a 30 dB gain and a 1.2 dB NF. One of the LNAs has an NF of 0.9 db, a P1 dB of −22 dBm, and an IP3 of −10 dBm. The other LNA has an NF of 1.6 dB, gain of 17 dB, P1 dB of +12 dBm, and IP3 of 0 dBm. The mixer 74 preferably has a CG of +9 dB, a P1 dB of −7 dBm, and IP3 of −8 dBm. The IF amplifier 76 preferably has a P1 dB of 9.5 dBm and NF of 5.5 dB. The IF filter 78 preferably has a bandwidth of 7 MHZ and an IL of 9 dB. The high speed A/D converter 64 is preferably a 12-bit converter operating at a rate of 16.384 MSPS, while the low speed A/D converter 66 is preferably a 12-bit converter that operates at a rate of 262.144 KSPS.

When the correlator of the present invention compares a known data pattern with sampled data, the preferred sampling rate is 8 times the data rate, in this case 262.144 kHz. This sampling is done by a low speed 12 bit a/d converter 66 connected to the RSSI 62 of the IF. When a correlation occurs, the correlator output is synchronized to within ⅛ of a bit. This starts the timing for decoding the rest of the packet 30 from this time. Preferably, decoding of the packet 30 uses the center ¾ of each bit and the first ⅛ and the last ⅛ of each bit is discarded due to uncertainty. One particular advantage of this embodiment is that it enables the present invention to accomplish effective data sampling at a rate less than the sampling rate dictated by the Nyquist theorom (i.e., sampling must occur at more than twice the effective data transfer rate). In one sense, the correlator effectively allows the decoder to operate as a synchronous power detector for the wideband signal.

Preferably, the preamble 32 of the packet 30 consists of 20 bits plus one sync bit. This data is Manchecter encoded so we have 42 "chips" (i.e. transition states) possible to correlate on. The first 34 chips are used to correlate on and the last 6 to determine the best bin for data decoding. There is a delay of 2 chips between correlation and decoding to allow for processor set up. The last 6 chips are preferably in a 1010 pattern so once a correlation is detected, the high speed A/D converter 64 can sample the 70 MHz IF. Preferably, the 70 MHz IF signal is actually undersampled; however, the frequency translates.

Figure 5:
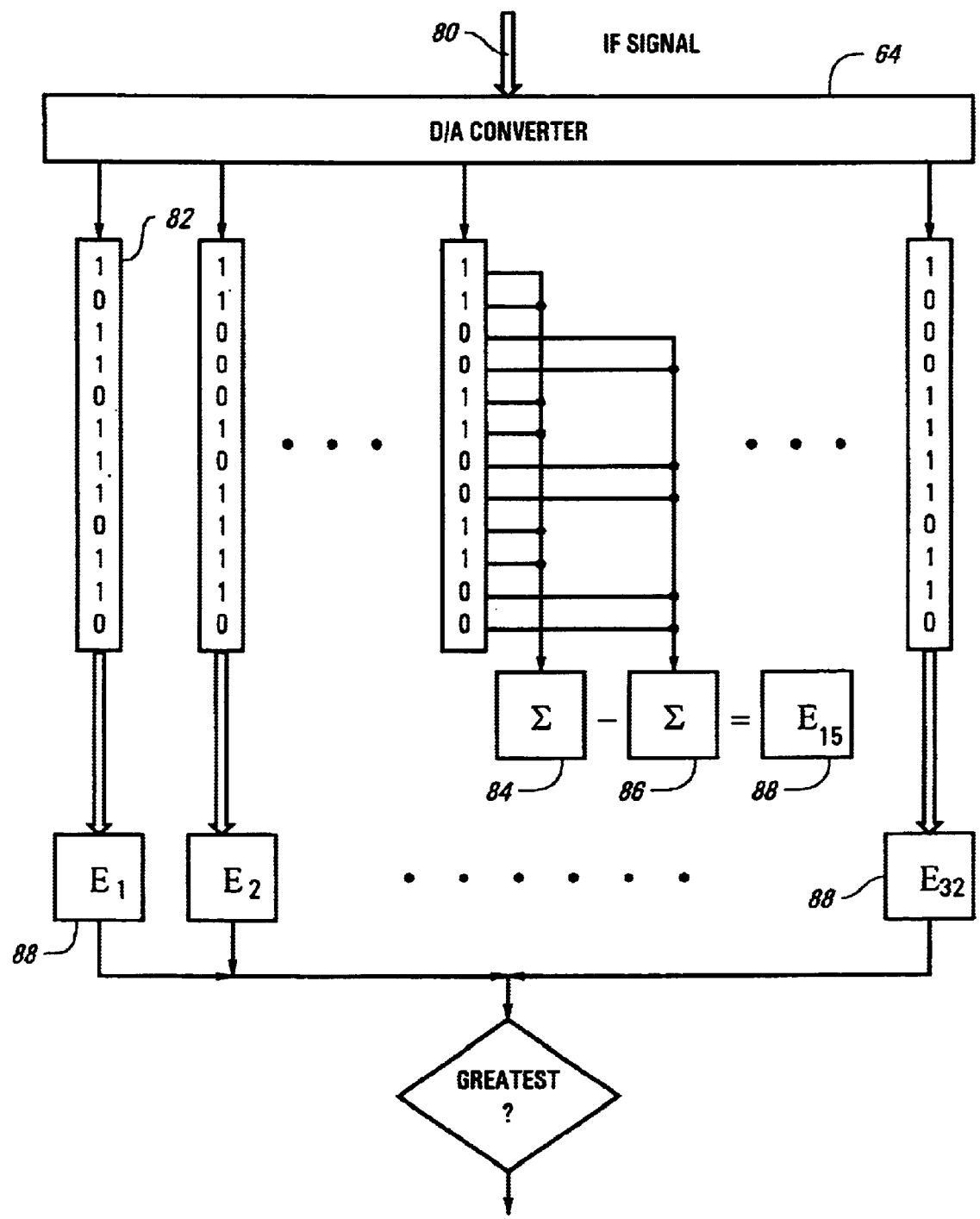
FIG. 5 is a schematic diagram showing a preferred embodiment of the operation of the FFT algorithm in accordance with the present invention.

In this embodiment, the sampling rate of the IF signal 80 is 16.384 MHz. This data is fed to the DSP 52 by the high speed A/D converter 64 which enables the DSP 52 to perform the FFT operation at a rate of two times the data rate, or 65.536 kHz. A 64 point FFT is performed producing thirty-two frequency bins 82 as shown schematically in FIG. 5. After 12 sets of samples are converted by the FFT engine, each frequency bin 82 is evaluated for energy matching the pattern of the last six chips. For each bin 82, all of the samples that are expected to be a 1 value are summed (shown schematically at 84), and the sum of all of the values that are expected to be a zero value (shown schematically at 86) is subtracted from the sum 84 to produce an energy value 88 for each bin 82. If a bin 82 contains random noise, the total energy value 88 of that bin will be very low since the sum of six noise values minus six noise values is low noise value. If there is data present and of the correct timing to match the preamble just correlated on, the ones will sum to 6 times the average energy present, and then six times the noise will be subtracted. Actually the sum of 1 values 84 will be signal plus noise and the sum of the zero values 86 will be subtracted as just noise leaving only the sum of signal values. In the end the bin 82 that has the highest signal sum for the energy value 88 is considered the bin containing the signal. Once the best bin is known, that bin 82 is flagged and the sampling and FFT conversion process continues throughout the rest of the data stream.

The DSP 52 preferably has enough computational horsepower to get all of the samples at 2 times oversampling the data; however, the preferred DSP can only perform one FFT per bit time. In this embodiment, the data is buffered and a second set of FFT's is performed in a post process operation. This causes a slight delay in the ability of the radio 14, 16 to get back to decoding new packets so a sample is also taken off of the low speed a/d converter tied to the RSSI line. This runs at the 8 times over sampling rate of the correlator. The values are used to try and decode the data. If the signal is strong enough data can be decoded from RSSI alone. If decoding is successful then the DSP dumps the FFT data and starts the correlator again looking for another packet of data. If RSSI decoding is unsuccessful then the DSP 52 performs the second set of FFT's and tries to decode on the best bin. If this is unsuccessful then the DSP 52 averages the best bin with the next bin higher and performs another decode. If this is unsuccessful it tries again averaging the best bin with one bin lower. As soon as one of the attempts succeeds then the data is dumped and the correlator starts over. If all of the attempts fail then the packet is marked as bad data. By averaging the adjacent bins with the best bin the radio can track a signal that drifts from one bin to the other.

As previously described, the RSSI voltage from the IF stage filter 78 is sampled with an A/D converter 66 and input to the DSP 52. Preferably, the sample is placed in a stack of samples internal to the DSP 52 with the oldest sample shifting out of the stack as the newest sample is shifted in, preferably, the stack is thirty four samples long, with each sample representing one of the bits of the preamble 42 to be correlated. It should be noted that the length of the stack is not critical to the performance of the present invention. Good correlations have been demonstrated using a subset of this number of samples. The number of samples (thirty-four) is really a subset of the entire ERT preamble 32 that is transmitted. After the new sample is taken and saved each sample in the stack is compared to a value representing the known and expected preamble. In a preferred implementation, if the known value of a bit of the preamble 32 is expected to be a binary one, it is assigned a value of one, whereas if the known value is expected to be a binary zero, the bit is assigned a value of negative one. The known value is compared by multiplying the unknown value from position one by the known value of position one. Then the unknown value of position two is multiplied by the unknown value of position two and so on until all thirty four unknown values have been multiplied by their corresponding known values. The results from all of the multiplications are then summed. This gives a correlation value to the current set of samples. Another sample is taken at the appropriate time and the whole process runs over again. The appropriate time is determined by the data rate of the ERT message. As previously described, in a preferred implementation the signal is oversampled 8 times so the list is 8 times longer as is the known bit list. The sampling rate is 8 times faster than the data rate as well. This allows the preferred embodiment to more accurately synchronize to the data.

The correlation operation is preferably a digital implementation of convolution, where a known function of the preamble 32 is compared with an unknown function, the data samples. Correlating on 34 data chips effectively increases the radio sensitivity by averaging the data sample over the 34 bits. In practice, this allows for detection of a preamble 32 with 6 to 12 dB better sensitivity than can be decoded. The output of the correlator is compared to a threshold value. The threshold is determined by taking an average of up to 256 raw input samples. This average is preferably a measure of the input signal strength and the correlator is a measure of the probability of a preamble. If there is a strong signal, the correlator value and the correlator threshold increase. Similarly, both values decrease with low signal levels. What is being examined is the relationship between the two values. The actual threshold preferably is empirically derived and is a percentage of the signal average. If the correlator exceeds this value, the present invention assumes a preamble 32 is present. The probability of detection can be adjusted by adjusting the threshold level. The lower the level, the greater the probability of finding a preamble and the greater the probability of a false detection.

Once a preamble is detected, there preferably are 8 chips remaining in the preamble 32 that have yet to be read. At this point, the high speed A/D converter 64 is activated. Although the A/D converter 66 could have been running all along, preferably the A/D converter 66 is turned off to save power. The high speed A/D converter 66 samples the IF signal 70. The samples are then fed into the DSP 52, which runs a 64 point FFT to creates thirty two unique frequency bins 82, each 256 kHz wide as previously described. Preferably, each frequency bin 82 is represented by a complex number that is converted into power by squaring the real and imaginary parts and adding them together. Starting this process takes a little time, so preferably the next two data samples of the incoming preamble are discarded. This leaves six bits of the incoming preamble that the expected state of is known. Since the DSP knows what it is looking for, the DSP 52 examines the frequency bins 82 for the next six bit samples for the known pattern. When there is a bin 82 that contains a 101010 pattern (representing 12 known chips) in time with the expected preamble, that bin is labeled as the best bin as described in connection with the description of FIG. 5. This is essentially how the initial "frequency adjustment" is accomplished. It is not really adjusting a frequency, but rather it is determining the frequency where a transmission is occurring. Once the best bin is determined, the DSP uses the FFT algorithm to attempt decode the body 34 of the ERT message 30 on that channel. Since the ERT message 30 contains a CRC error detection byte 36, it is possible determine a successful decode if the decode passes CRC check.

While the decoding is taking place, preferably all of the data from the FFT processing is saved. If the decoding fails to find a good CRC check, the receiver may have missed the ERT message 30 because the FHSS signal 20 drifted in frequency, or was right on the boundary between two bins 82. In this instance, the FFT process of decoding is repeated on data that represent the best bin averaged with the next higher adjacent bins. If the message drifted higher in frequency then it would have some of its energy moved into the next higher bin 82. If the message drifted lower in frequency, then it would have some of its energy moved into the next lower bin 82. Although the preferred embodiment utilizes a simple averaging of adjacent bins, it will be apparent that other combinatorial schemes could also be utilized to accomplish this process. The use of data from bins adjacent to the frequency associated with the best bin allows the preferred embodiment of the present invention to track the ERT message 30 in frequency. If the CRC fails by averaging in the adjacent higher bin, then the decode is run averaging the best bin with the adjacent lower bin, tracking the message lower in frequency. Throughout this decoding process no oscillators were adjusted in the radio. The tracking is a result of the output of the FFT frequency bins and the signal is tracked across bins.

Another difference between the preferred embodiment of the receiver 42 in accordance with the present invention and previous versions of FHSS receivers is that legacy radios have always used a ERT signal detector with a logarithmic response. This means that the signal detector would see both weak and strong ERT signals well, also known as having a large "dynamic range". The problem with logarithmic detectors is that they are susceptible to the presence of an interfering signal, which basically pegs the detector to one side and will not allow the detector to effectively see ERT signals. The impact of this problem would be complicated by the much wider window for detection inherent in the receiver 42. To overcome this problem, the receiver 42 uses a linear detector 62, which can see small ERT signals both with and without the presence of other interfering energy in band. The challenge with linear detectors is that they normally exhibit a small dynamic range. The receiver 42 of the preferred embodiment of the present invention compensates for this by using a front-end amplifier 71 that is very sensitive for weak signals, and switches in attenuation to quiet down loud ERT signals. This essentially gives the best of both worlds, a wide dynamic range, and a low sensitivity to in-band interferers.

It will be seen that because the processing of weak signals by the FFT engine is a digital signal process that can be repeated against stored data, the present invention affords the ability to simultaneously process multiple message packets 30 by multiplexing the digital sample stream into multiple FFT engines, which can be implemented as segmented threads in a single DSP or by multiple DSPs, depending upon the sampling rate and processing power of the DSPs.

Although the present invention has been described with respect to the preferred embodiment, it will be understood that numerous changes and variations to aspects of the invention can be made and that the scope of the present invention is intended to be consistent with the claims as follows.

What is claimed is:

1. A wireless spread spectrum communication system for transmitting data comprising:
   a plurality of end point transmitters transmitting data via a frequency hopped spread spectrum signal, the transmitting signal being sent without the benefit of frequency stabilization; and
   at least one receiver responsive to the frequency hopping spread spectrum signals, each receiver including:
      a correlator that samples at least a first portion of a preamble of the signal and correlates the portion of the preamble with a known preamble pattern to determine a probability of correlation; and
      a signal processor that applies an algorithm to the signal in response to the probability of correlation to track a narrowband frequency of the signal based on at least a second portion of the preamble and to decode data encoded within the signal subsequent to the preamble.

2. The system of claim 1 wherein the signal processor is a digital signal processor (DSP).

3. The system of claim 1 wherein the algorithm used to identify the narrowband frequency of the signal and to decode the data within the signal is a Fast Fourier Transform (FFT).

4. The system of claim 3 wherein the FFT algorithm operates on sampled data to produce multiple bins, each bin corresponding to a different narrowband frequency within the signal.

5. The system of claim 4 wherein the FFT algorithm sums a plurality of chip values in each bin against expected chip values to determine a bin having a highest value as the narrowband frequency containing the encoded data signal.

6. The system of claim 3 wherein a strength of the signal supplied to the correlator is evaluated and if the strength of the signal supplied to the correlator is strong enough to perform a decode of the data encoded within the signal subsequent to the preamble, the signal processor does not use the FFT algorithm to decode the data encoded within the signal subsequent to the preamble.

7. The system of claim 1 wherein the correlator samples data using a 12 bit analog-to-digital converter connected to a Received Signal Strength Indicator (RSSI).

8. The system of claim 7 further comprising:
   a mixer that receives the signal and mixes the signal with a base signal to produce an intermediate frequency that is supplied as the signal to the correlator and the signal processor.

9. The system of claim 1 wherein the correlator samples over at least sixty-six percent (66%) of a wideband frequency for the signal.

10. The system of claim 1 wherein the correlator is implemented using the digital signal processor.

11. The system of claim 10 wherein the digital signal processor is supplied with two sampled inputs, a first sampled input from an analog-to-digital converter operating at a first speed and a second sampled input from an analog-to-digital converter operating at a second speed, where the second speed is slower than the first speed.

12. The system of claim 11 further comprising a received signal strength indicator (RSSI) detector circuit operably connected to an input to the second analog-to-digital converter.

13. The system of claim 1 wherein the receiver further comprises:
   a switchable front-end amplifier that operably receives the signals and selectively attenuates the signals based on signal strength; and
   a linear detector operably coupled to an output of the front-end amplifier and to an input of the correlator.

14. The system of claim 1 wherein the signal is sampled during the decoding of the encoded data at a rate less than twice a data rate of the encoded data.

15. The system of claim 1 wherein the signal is sampled during the decoding of the encoded data at unequal intervals.

16. The system of claim 1 wherein the signal is sampled during the decoding of the encoded data in a middle portion of a bit period without sampling at edge portions of the bit period.

17. The system of claim 16 wherein the middle portion represents seventy five percent (75%) or less of the bit period.

18. The system of claim 1 wherein the correlator operate to establish both a bit synchronization and a frame synchronization for the encoded data in the signal.

19. The system of claim 1 wherein the signal processor initiates the algorithm only when the probability of correlation is greater than a threshold value.

20. The system of claim 19 wherein the threshold value is established based on an average of a predetermined number of raw input bits.

* * * * *

UNITED STATES PATENT AND TRADEMARK OFFICE
CERTIFICATE OF CORRECTION

PATENT NO.         : 6,934,316 B2
APPLICATION NO. : 09/920355
DATED                 : August 23, 2005
INVENTOR(S)       : Cornwall et al.

It is certified that error appears in the above-identified patent and that said Letters Patent is hereby corrected as shown below:

Column 2, line 33, please delete "5,052,406" and insert --6,052,407--.

Column 2, line 43, please delete "the" and insert --that--.

Column 3, line 65, please delete "strength" and insert --strength--.

Column 4, line 14, please insert --.-- after "decode".

Column 4, line 33, please delete "thousand" and insert --thousands--.

Column 5, line 28, please delete "20" and insert --18--.

Column 6, line 57, please delete "8051".

Column 6, line 59, please delete "from to" and insert --from/to--

Column, 7, line 21, please delete "than" and insert --then--.

Column 7, line 26, please delete "sometime" and insert --sometimes--.

Column 7, line 57, please delete "below" and inert --*below*--.

Column 9, line 28, please delete "and" and insert --an--.

Column 11, line 28, please delete "," and insert --.--.

Column 11, line 29, please delete "preferably" and insert --Preferably--.

Column 12, line 8, delete "." and insert --,--.

Column 12, line 21, please delete "creates" and insert --create--.

Column 12, line 39, after "attempt" please insert --to--.

UNITED STATES PATENT AND TRADEMARK OFFICE
CERTIFICATE OF CORRECTION

PATENT NO. : 6,934,316 B2
APPLICATION NO. : 09/920355
DATED : August 23, 2005
INVENTOR(S) : Cornwall et al.

It is certified that error appears in the above-identified patent and that said Letters Patent is hereby corrected as shown below:

Column 14, line 54, please delete "operate" and insert --operates--.

Signed and Sealed this

Twenty-seventh Day of March, 2007

JON W. DUDAS
*Director of the United States Patent and Trademark Office*